United States Patent

Hess

[15] 3,662,120

[45] May 9, 1972

[54] TAPE RECORDER USEFUL AS AN AUTOMATED TEACHING APPARATUS

[72] Inventor: Rene Hess, Avon, France

[73] Assignee: Compagnie internationale pour la diffusien de la culture europeenne, societe anonyme (Cidice), Fribourg, Canton of Fribourg, Switzerland

[22] Filed: June 3, 1969

[21] Appl. No.: 829,953

[30] Foreign Application Priority Data

June 13, 1968 Switzerland ..........................8777/68

[52] U.S. Cl. ........................................179/100.2 S, 35/35 C

[51] Int. Cl. ........................................................G11b 15/06

[58] Field of Search ..............179/100.2 S, 100.2 B, 100.2 E; 35/35 C

[56] References Cited

UNITED STATES PATENTS

| | | | |
|---|---|---|---|
| 2,385,701 | 9/1945 | Halstead | 179/100.2 |
| 2,847,513 | 8/1958 | Schlafly | 179/100.2 |
| 3,257,515 | 6/1966 | Nakamatsu | 179/100.2 |
| 3,373,508 | 3/1968 | Molden et al. | 35/35 |
| 3,423,850 | 1/1969 | Snepvangers | 35/35 |
| 3,434,725 | 3/1969 | Eibensteiner | 179/100.2 |
| 3,458,667 | 7/1969 | Burquez | 179/100.2 |
| 3,492,668 | 1/1970 | Thomson | 179/100.2 |
| 3,488,867 | 1/1970 | Lyon et al. | 35/35 C |

FOREIGN PATENTS OR APPLICATIONS

| | | | |
|---|---|---|---|
| 506,168 | 9/1930 | Germany | 179/100.2 |

*Primary Examiner*—Stanley M. Urynowicz, Jr.
*Assistant Examiner*—Robert S. Tupper
*Attorney*—Christie, Parker and Hale

[57] ABSTRACT

In addition to having all of the conventional components, the tape recorder has a detection head for detecting non-magnetic markers on a specially prepared tape. A separately housed control circuit automatically switches the different functions of the recorder in response to the output of the detection head.

8 Claims, 1 Drawing Figure

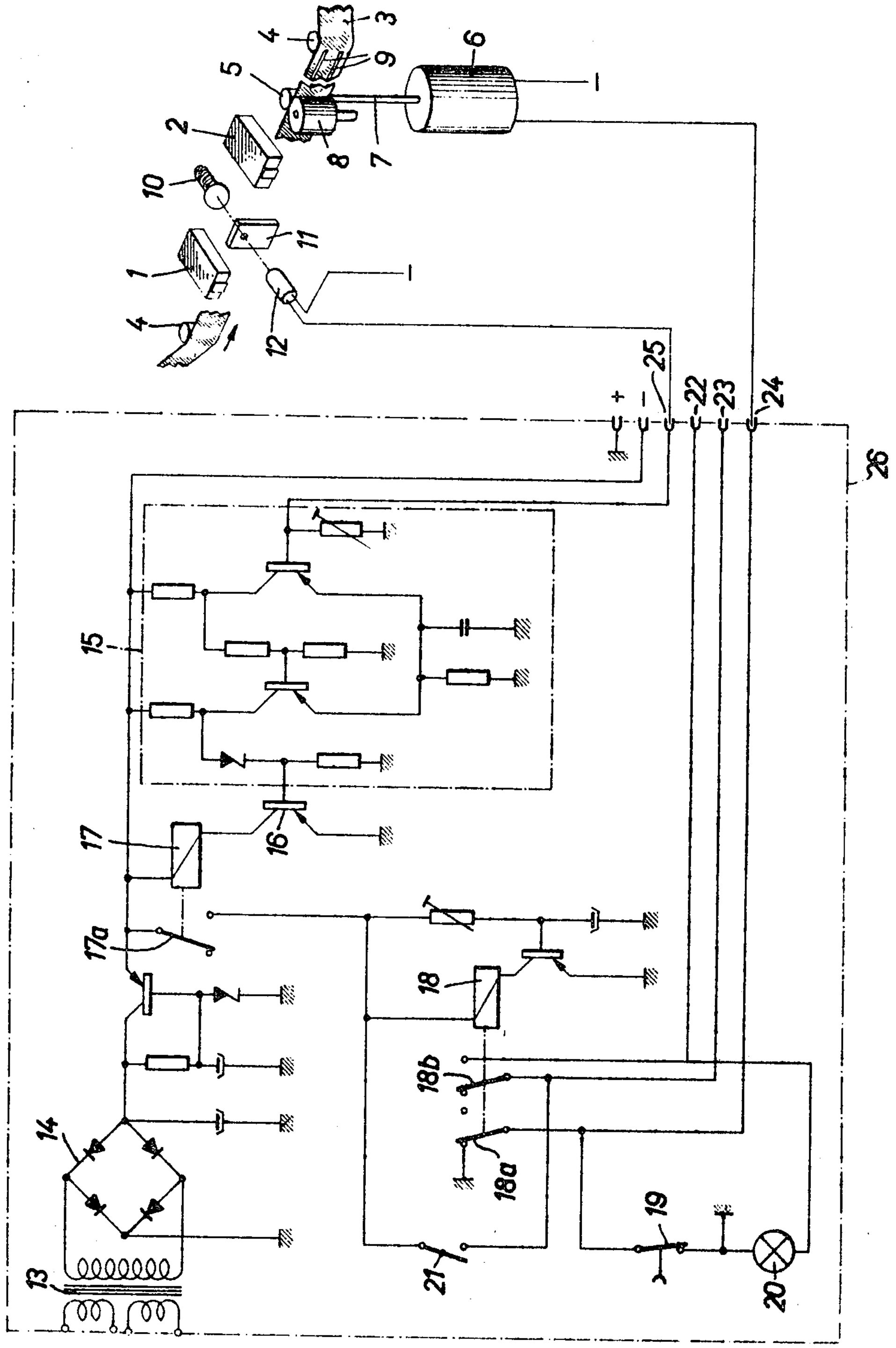

TAPE RECORDER USEFUL AS AN AUTOMATED TEACHING APPARATUS

BACKGROUND OF THE INVENTION

The invention relates to a tape recorder for use with conventional or a specially prepared tape.

Teaching today, notably the teaching of foreign languages, more and more frequently uses tapes with prerecorded zones that are played on a tape recorder that enables the student to hear the prerecorded zones and to record his reply in other zones. The best known of these schemes use tapes with two or four tracks. The prerecorded zones are carried by a first track and are separated from each other by spaces sufficiently long to permit the student to record his answers in these spaces on a second track. These schemes have the disadvantage that a great deal of tape is used up, since a separate track is used for the teacher's recording and the student's recording.

SUMMARY OF THE INVENTION

The Swiss patent application Ser. No. 8,777/68 U.S. application Ser. No. 830,039 filed, June 3, 1969, now abandoned,) describes a method for preparing a tape which considerably reduces the amount of tape used. A single track contains the prerecorded zones and the zones in which the student records his answers. The tape is provided with non-magnetic markers that enable the prerecorded zones to be distinguished from the "free" zones for the student.

To use a tape of this kind, the tape recorder must embody a detection arrangement that automatically switches the recorder from "playback" to "record" when a prerecorded zone is followed by a "free" zone and then again to "-playback" when the next prerecorded zone appears. In order to preclude any possibility of blundering, the switching between the modes of operation must be completely automatic and the markers embodied by the tape must cause the switching at a given point along the tape path.

An object of the invention is to provide a tape recorder for economically using these tapes.

This object and others of the invention will be apparent from the following detailed description of one embodiment and its modifications.

BRIEF DESCRIPTION OF THE DRAWING

The invention will be described, with reference to the single FIGURE of the accompanying drawing, showing a circuit schematic and ancillary components of one embodiment.

DESCRIPTION OF THE PREFERRED EMBODIMENT AND ITS MODIFICATIONS

The erase head 1 and the record/playback head 2 are conventional components of a tape recorder. They are so mounted at a common height on a support (not shown) that one of the tracks of a magnetic tape 3 passes by them. The tape is guided by rollers 4. To move the tape, the shaft 7 of an electric motor 6 is rigidly connected to the capstan 5, against which an idler 8 holds the tape. The motor 6 is of the constant speed type. The tape moves from left to right, as seen in the drawing. It unwinds from a payoff reel (not shown) and winds onto a take-up reel (also not shown) located symmetrically on the other side of the tape recorder. The tape recorder is so designed that, normally, when the recorder is switched to "-playback," the recording on one of the tracks of the tape is detected by the playback head 2 and reproduced by earphones or a loudspeaker, whereas if the recorder is switched to "record," the sound waves falling on the microphones are recorded on the same track. The erase head 1 operates only when the recorder is switched to "record." This arrangement permits prerecorded zones to be reproduced without erasing them. The prerecorded zones can, for example, carry the words of the teacher which the student must repeat. These zones are just sufficiently spaced from each other to permit the student to answer before the next prerecorded zone begins to move past the playback head. In order to permit automatic switching that eliminates blunders, the tape 3 incorporates markers that identify those zones, the "free zones," reserved for the student's replies. These markers consist of grooves 9 made on the tape between the prerecorded zones, these grooves starting slightly before the end of a prerecorded zone and ending the same short distance before the start of the following prerecorded zone. The grooves can be formed in the oxide coating of the tape by a chisel. Since the base of the tape is transparent, the groove forms along the central axis of the track a narrow slit in the oxide that is transparent to a light beam. The tape 3 can be automatically marked after, or simultaneously with, the recording of the prerecorded zones. The means for doing this are described, for example, in the aforementioned Swiss patent application Ser. No. 8777/68 (U.S. application Ser. No. 830,039 filed June 3, 1969).

The tape recorder is equipped with a detecting head comprising a light source, symbolized by an incandescent lamp 10, a collimator 11, and a photoelectric cell 12. This arrangement is so designed that when the light beam, shaped by the collimator 11, passes through a groove 9, it falls on the photoelectric cell 12, which is connected to the control circuit in the Figure. The control circuit is powered by a rectifying bridge 14 providing a negative voltage and connected to the secondary of the transformer 13. The bridge output powers an amplifier 15, which will not be described in detail and which controls a transistor 16 connected in series in the circuit of the coil of a relay 17. The input of the amplifier is so connected to ground by the photoelectric cell 12 that whenever the cell is shone upon by the light beam the transistor 16 conducts and the relay 17 closes. But as soon as the groove 9 has passed by the aperture of the collimator 11, the light beam is interrupted, the transistor 16 becomes non-conductive, and the relay 17 again opens.

The relay 17 serves as the control relay. When its contact 17a is closed, current can flow between the negative terminal of the bridge 14 and ground through the coil of a double pole, single throw time delay relay 18 having the contacts **18*a* and 18*b*. Contact 18*a* is normally closed, ensuring that the motor 6 turns. It opens when the coil of relay 18 is energized, causing the motor 6 and the tape 3 to stop immediately, provided that the hard-operated switch 19, which is connected between the motor 6 and ground in parallel with the contact 18*a*, is open. But if this switch is closed, the energization of the relay 18 and the opening of its contact 18*a* does not shut off the motor 6. The signal lamp 20 is turned on when the contact 18*b* of relay 18, contact 17*a* of relay 17, and the switch 21 are all closed. Switch 21** preselects between "record" and "playback."

The tape recorder of the invention comprises, in addition to the parts shown in the Figure, the usual equipment of a tape recorder. It has a microphone, a loudspeaker or earphones, as well as a high frequency oscillator for the erase head 1. The circuits for connecting these components to the record/playback head or to the erase head are conventional and are not shown.

In a particularly advantageous embodiment of the invention, the tape recorder proper and the control circuit, the latter denoted generally by the numeral 26, can be mounted in separate housings. In this case, the tape recorder can be used alone as a conventional dictaphone without the box containing the circuit 26. The lamp 10 and the photoelectric cell 12, which, of course, are not used when the recorder is used as a dictaphone, do not in the least hinder this use of the recorder. Thus, the tape recorder can be made very small and portable. Used as a dictaphone, it can be powered by a battery held in its frame.

The box for the circuit 26 is separate, therefore, from that for the tape recorder, and incorporates terminals +, −, 22, 23, 24, and 25. These terminals can be connected by a plug and a cable to the tape recorder, and the primary of the transformer 13 to the mains. Thus connected, the tape recorder and circuit 26 constitute a language laboratory capable of using the two-track, prerecorded tapes having "free" zones marked by the grooves 9, as the tape 3. Under these conditions, the tape recorder operates in the following manner.

1. Recording without automatic tape stop

Once the connections just described have been made, the manual switch 19 is turned "on" and the preselection switch 21 to "record" : in other words, both of these switches are closed. As will be shortly explained, the record/playback head 2 is switched automatically to "playback" when a prerecorded zone moves past it and to "record" when the following "free" zone appears. Moreover, the erase head oscillator is turned on as soon as the start of a "free" zone appears before the erase head and is turned off when the start of a prerecorded zone appears opposite the erase head. These different functions are controlled in the following manner by the control circuit 26.

Assume that the tape 3 is so positioned that the start of a prerecorded zone is located before the record/playback head 2. The track having this prerecorded zone does not contain a groove 9 positioned opposite the aperture of the collimator 11; consequently, the cell 12 is not shone upon, and the amplifier 15 and transistor 16 prevent energization of the relay 17. Contact 17*a* is open, relay 18 is not energized, and its contact 18*a* is closed. Since the terminal 24 connects one side of the motor 6 to ground, the motor is powered. The lamp 20 is extinguished; and since the terminal 22 is not under voltage, the recording facility is shut off, but the playback facility of the tape recorder is turned on. The tape moves by the head 2, and the recording on it is reproduced in the loudspeaker.

Just when the start of a groove 9 appears at the aperture of the collimator 11, the end of the prerecorded zone is located before the erase head 1. The groove 9 extends into the previous prerecorded zone for a length equal to the distance separating the groove detecting head (10, 11, 12) from the record/playback head 2. From this moment on, the cell 12 is excited, relay 17 is energized, and its contact 17*a* closes. Through contact 21, which is closed, and terminal 23, the erase head oscillator is immediately turned on and the head begins to erase any previous student's recording that may be carried by the "free" zone moving past the erase head 1. The closing of the contact 17*a* also causes energization of the time delay relay 18. After about 0.5 second—that is, the time required for the end of the prerecorded zone to appear just opposite the record/playback head 2—the contact 18*b* closes and the contact 18*a* opens. The opening of the latter contact does not affect the motor 6, because the switch 19 continues to ground one side of it. The closing of contact 18*b* turns on both the lamp 20 through the contact 17*a* and the recording facility through the terminal 22. This switching to "record" automatically shuts off the playback facility.

All of the while that the groove 9 is passing by the groove detecting head, the tape recorder remains switched to "record." When the end of the groove 9 passes by the cell 12, the start of the following prerecorded zone is before the erase head 1. The cell 12 is no longer excited, the transistor 16 is cut off, the relay 17 is not energized, its contact 17*a* is open, and the relay 18 is also not energized, its contact 18*a* being closed and its contact 18*b* being open. The lamp 20 is shut off, and the two terminals 22 and 23 are no longer under voltage. The tape recorder is switched immediately to "playback," and the erase head 1 is shut off. This mode of operation continues until the start of the next groove 9 is located before the aperture in the collimator 11—that is, until the end of the prerecorded zone is located before the erase head 1. The cycle of operation just described repeats automatically.

2. Recording with automatic tape stop

The preselection switch 21 is always closed, but the manual switch 19 is open, which is the automatic stop position. Assume, once again, that the end of a groove 9 has passed through the light beam and that the start of a prerecorded zone is located before the erase head 1. Since the cell 12 is not excited, relays 17 and 18 are unenergized, and the tape recorder is switched to "playback," because the terminals 22 and 23 are not under voltage. The recorded voice of the teacher is reproduced by the speaker of the recorder. When the start of the next groove 9 appears before the groove detecting head and the end of the prerecorded zone has passed by the erase head 1, the relay 17 is reenergized and its contact 17*a* closed. The switchings previously described reoccur: the erase head is immediately turned on, and after about 0.5 second contact 18*b* closes and contact 18*a* opens. Since switch 19 remains open, the motor 6 stops. The tape 3 remains stationary just at that moment that the prerecorded zone has finished passing by the head 2, which gives the student time to prepare in his mind the reply that he will recite into the microphone. The tape recorder remains switched to "record" and to "erase," since the relay 17 is still energized. The switch 19 is manually closed to turn on the motor 6 and move the tape 3.

3. Playback

While switched to "playback," the student can play the entire tape to hear the teacher's instructions and his own replies in succession.

To do this, the preselection switch 21 is opened, which corresponds to "listen." Switch 19, however, remains closed. The opening of switch 21 ensures that the terminals 22 and 23 remain voltage free and that, consequently, the recording and erase facilities are shut off whatever the state of the relays 17 and 18. Since the switch 19 is closed, the motor 6 runs at all times. While a groove 9 passes by the groove detecting head, the relay 17 is energized and, therefore, also the relay 18; but this does not influence the operation of the tape recorder.

The tape recorder described consequently enables the use of prerecorded tapes carrying, for example, questions, and enables recording, at a later date, in zones between the prerecorded zones on the same track of the tape. The later recording can be, for example, the answers to questions asked in the prerecorded zones, each answer immediately following its question. The tape recorder of the invention therefore enables a language laboratory using a minimum of tape. This result is achieved because it is possible to mark the track carrying the prerecorded zones with non-magnetic markers detectable by a detecting head on the tape recorder. In forming grooves 9 by chiseling out the oxide coating on the transparent tape base, a two-track, prerecorded tape having a width of about 2.75 mm has been used with the tape recorder described. The grooves made along the central axis of each track had a width of 0.2 mm, and it was observed that they had virtually no audible effect on the ability of the tape to record, yet they were perfectly detectable by the cell 12. The tape recorder can be built very small. If the control circuit is housed in a separate box, the tape recorder itself need be hardly larger than those of extremely small portable dictaphones of the prior art. The photoelectric cell and its lamp can be very tiny and mounted on the tape recorder. Thus, it was possible in a tape recorder using mini-cassettes to house the lamp 10 in an axial bore provided in one of the fixing pins of the mini-cassette. A hole of tiny diameter, incorporated in the wall of this bore, is sufficient to let a light beam shine on the cell 12. The distance between the erase and record/playback heads was 24 mm, and the groove detecting head was positioned centrally between these two heads.

The tape recorder of the invention is so designed that in the absence of voltage it is always switched to "playback" and that, consequently, the erase head is then turned off. Since the erase head is turned on only when the light beam falls on the cell 12, the recorder cannot accidentally erase while a prerecorded zone moves past the erase head 1.

The markers instead of being grooves can also be zones of reflective paint, the lamp 10 and cell 12 being so arranged that the latter is shone upon by light reflected from the painted zones. In still another modification, the markers can consist of a coat of electrically conductive paint in the "free" zones, the photoelectric cell being replaced by a brush that contacts the tape.

Although the preferred embodiment and its modifications have been described, the scope of, and the breadth of protection afforded to, the invention are limited solely by the appended claims.

What is claimed is:

1. A tape recorder system comprising a record/playback head, an erase head and a detection head, said heads being fixedly positioned for use with the same track provided on a magnetic tape and said detection head being arranged for producing signals in response to non-magnetic markers provided on said track along length portions thereof which are to be distinguished from other unmarked length portions, said unmarked portions being magnetically recorded whereas said marked portions are unrecorded, and an electrical control circuit means, said circuit means being arranged for automatically turning said erase head off in the absence of said signal and on in the presence of said signal and for automatically providing for switching said record/playback head to "record" in the presence of said signal and to "playback" in the absence of said signal.

2. The tape recorder system as defined in claim 1, wherein the detection head is responsive to markers that render the tape transparent over their area, and wherein said detection head comprises a light source on one side of the tape and a photo transducer on the other side of the tape and opposite said light source, said source emitting a beam transverse to the tape and illuminating said transducer wherever the beam is free to pass through the tape, as determined by the markers.

3. The tape recorder system as defined in claim 1, wherein said detection head comprises a brush in contact with one face of the tape for detecting on that face the presence of electrically conductive coats that constitute the non-magnetic markers.

4. The tape recorder system as defined in claim 1, for use with tapes having light reflective markers, wherein said detection head comprises a light source and a photo transducer arranged to be shone upon by a beam from said source when the beam is reflected by the tape.

5. The tape recorder system as defined in claim 1 wherein said record/playback head, erase head, and detection head are mounted in a tape recorder and wherein said electrical control circuit means is mounted separately from the tape recorder, and further including means for electrically connecting said control circuit means to the tape recorder.

6. The tape recorder system as defined in claim 1, including a manually operated preselection switch incorporated by said control means for permanently disabling the record and erase functions and for keeping the tape recorder switched to "playback" at all times.

7. A tape recorder system according to claim 1 wherein said detection head is positioned between said erase and record/playback heads, and means are provided for passing said tape firstly in front of said erase head, then in front of said detection head and then in front of said record/playback head, and wherein said control circuit means comprises a time delay relay for switching said record/playback head to "record" after a predetermined interval of time whenever said detection head starts to produce said signal.

8. The tape recorder system as defined in claim 7, wherein said time delay relay has a contact connected in the circuit of the tape recorder drive motor, and a manual switch shunted across said relay contact for voluntarily enabling automatic stopping of the tape at the moment when the record/playback head is switched to "record."

* * * * *